Patented Dec. 18, 1928.

1,695,656

UNITED STATES PATENT OFFICE.

ERICH HESSE, OF BRESLAU, GERMANY, ASSIGNOR TO THE FIRM GEHE & CO. A.-G., OF DRESDEN, GERMANY.

METHOD OF PRODUCING NARCOTICA.

No Drawing. Application filed November 17, 1927, Serial No. 234,039, and in Germany March 10, 1927.

In order to create a local narcosis or anaesthesia cocaine was hitherto used in solutions of rather high concentration. The use of cocaine is therefore very dangerous in cases in which there is any possibility that the substance may reach the circulation of matter. When cocaine is for creating a local narcosis it is therefore very difficult to prevent more or less serious poisonings of the organism. I have however now found that when cocaine or salts of cocaine are mixed with adonidine then products will be formed which with respect to their narcotising effects by far surpass the cocaine. The new products will even at $\frac{1}{10}$ of the usual concentration give the same effect as or even a better effect than cocaine alone.

When producing (the new remedy) in practise the cocaine or the salts of cocaine are treated with a quantity of adonidine amounting maximally to 100 per cent of the cocaine to be treated.

When working in accordance with the above mentioned method a concentration of 5% will yield the same effect as the cocaine solutions of the highest concentration. The adonidine is employed in quantities amounting to 0,5-2%. The special technical effects obtained are these, that cocaine is saved and that the poisonous effects of both ingredients are considerably reduced.

A further advantage is this that the misuse of cocaine will decrease, since the poisonous effect of the same is considerably reduced.

I claim:

1. A method of producing anaesthetic remedies, consisting in treating cocaine-containing substances with adonidine.

2. A method of producing anaesthetic remedies, consisting in treating salts of cocaine with adonidine.

3. A method of producing anaesthetic remedies, consisting in treating cocaine with adonidine.

4. A method of producing anaesthetic remedies, consisting in treating cocaine with an amount of adonidine not surpassing 100 per cent of the cocaine.

5. As a commercial product, an anaesthetic remedy containing cocaine and adonidine.

Dr. ERICH HESSE.